(12) United States Patent
Han et al.

(10) Patent No.: US 6,184,671 B1
(45) Date of Patent: Feb. 6, 2001

(54) APPARATUS AND METHOD FOR CONTROLLING THE SUPPLY OF POWER TO A DEVICE WHEN A POWER ON/OFF SIGNAL IS INPUT

(75) Inventors: Sung-hoo Han, Suwon; Sang-ug Kang, Sungnam, both of (KR)

(73) Assignee: Samsung Electronics Co., Ltd., Kyungki-Do (KR)

( * ) Notice: Under 35 U.S.C. 154(b), the term of this patent shall be extended for 0 days.

(21) Appl. No.: 09/431,260

(22) Filed: Nov. 1, 1999

(30) Foreign Application Priority Data

Jul. 13, 1999 (KR) .................................................. 99-28204

(51) Int. Cl.[7] .................................................. G05B 24/02
(52) U.S. Cl. ............................................ 323/323; 323/351
(58) Field of Search ...................................... 323/284, 322, 323/323, 351

(56) References Cited

U.S. PATENT DOCUMENTS 4,500,795 * 2/1985 Hochstein et al. .................... 323/323

4,651,022 * 3/1987 Cowley ................................. 323/323

* cited by examiner

Primary Examiner—Shawn Riley
(74) Attorney, Agent, or Firm—Sughrue, Mion, Zinn, Macpeak & Seas, PLLC

(57) ABSTRACT

A power control apparatus is provided that receives an input power voltage from a power source and supplies a corresponding output power voltage to a device. The apparatus contains a counter, a processor, and a switch. The counter inputs a power control signal and outputs a count signal that corresponds to a lapsed time from when the power control signal is input. The processor inputs the count signal and outputs a time out signal. The time out signal has a first value if the lapsed time and a predetermined time have a certain relationship, and the time out signal has a second value if the lapsed time and predetermined time do not have the certain relationship. The switch receives the input power voltage from the power source and the time out signal. If the time out signal has the second value, the switch does not output the output power voltage to the device. On the other hand, if the input power voltage is received and the time out signal has the first value, the switch outputs the output power voltage to the device. In addition, a method performed by the power control apparatus is provided.

20 Claims, 3 Drawing Sheets

APPARATUS AND METHOD FOR CONTROLLING THE SUPPLY OF POWER TO A DEVICE WHEN A POWER ON/OFF SIGNAL IS INPUT

BACKGROUND OF THE INVENTION

1. Field of the Invention

The present invention relates to an apparatus for controlling the supply of power to a device when a power on/off command is input. More particularly, the invention relates to an apparatus that protects a device by waiting for several seconds before supplying power (or stopping the supply of power) to the device after a power on/off command has been input. Also, the present invention relates to method that is performed by the apparatus.

2. Description of the Related Art

Abruptly supplying power or stopping the supply of power to many devices may damage them. For example, when the power of a computer is turned off, the supply of power to peripheral devices (e.g. a hard disk) typically stops. However, the actuator of the hard disk continues to rotate towards a parked position due to the force of inertia. As the rotation of the disk gradually decreases, the actuator continues towards the parked position where it is secured and protected against shocks and vibrations. However, if a user turns the power on again before the actuator is parked, the rotation of the disk increases to a high speed. As a result, the actuator or the head of the actuator may contact the hard disk and severely scratch the surface of the disk.

Abruptly supplying or stopping the supply of power can also damage various electronic components such as capacitors. Specifically, if power is turned on while a capacitor is discharging, an instantaneous current abruptly flows through the capacitor and may damage the capacitor. A similar problem can also occur when power is turned off immediately after power is turned on.

In order to prevent the damage to hard disks mentioned above, an operating system for computers has been provided that parks a hard disk by using a special parking program, and the parking program is executed when a user activates a computer shut down function. However, unless the user knows about this function and actually activates it before turning of the computer, the hard disk can still be damaged.

SUMMARY OF THE INVENTION

An objective of the present invention is to provide an apparatus and method for controlling the supply of power to a device when a power on/off command is input.

In order to achieve the above and other objectives, a power control apparatus for receiving an input power voltage from a power source and supplying a corresponding output power voltage to a device is provided. The apparatus comprises: a counter that inputs a power control signal and outputs a count signal, wherein the count signal corresponds to a lapsed time from when the power control signal is input; a processor that inputs the count signal and outputs a time out signal, wherein the time out signal has a first value if the lapsed time is less than a predetermined time and has a second value if the lapsed time is greater than the predetermined time; and a switch that receives the input power voltage from the power source and the time out signal, wherein the switch outputs the output power voltage to the device when the input power voltage is received and the time out signal has the second value and does not output the output power voltage to the device when the input power voltage is received and the time out signal has the first value.

In order to further achieve the above and other objectives, a power control apparatus for receiving an input power voltage from a power source and supplying a corresponding output power voltage to a device is provided. The apparatus comprises: a counter that inputs a power control signal and outputs a count signal, wherein the count signal corresponds to a lapsed time from when the power control signal is input; a processor that inputs the count signal and outputs a time out signal, wherein the time out signal has a first value if the lapsed time is less than a predetermined time and has a second value if the lapsed time is greater than the predetermined time; and a switch that receives the input power voltage from the power source and the time out signal, wherein the switch does not output the output power voltage to the device when the input power voltage is received and the time out signal has the second value and outputs the output power voltage to the device when the input power voltage is received and the time out signal has the first value.

In order to even further achieve the above and other objectives, a power control method for controlling the supply of a power supply voltage to a device is provided. The method comprises: (a) inputting a first power signal; (b) counting a lapsed time from when the first power command is input; (c) inputting a second power signal; (d) determining if the lapsed time and a predetermined time have a first predetermined relationship when the second power signal is input; (e) selectively outputting the power supply voltage to the device depending on whether or not the lapsed time and the predetermined time have the first predetermined relationship.

BRIEF DESCRIPTION OF THE DRAWINGS

The above and other objectives and advantages of the present invention will become more apparent by describing in detail preferred embodiments thereof with reference to the attached drawings in which.

DESCRIPTION OF THE PREFERRED EMBODIMENTS

The following description of the preferred embodiments discloses specific configurations, components, and process steps. However, the preferred embodiments are merely examples of the present invention, and thus, the specific features described below are merely used to more easily describe such embodiments and to provide an overall understanding of the present invention. Accordingly, one skilled in the art will readily recognize that the present invention is not limited to the specific embodiments described below. Furthermore, the descriptions of various configurations, components, and steps of the present invention that would have been known to one skilled in the art are omitted for the sake of clarity and brevity.

Figure 1:
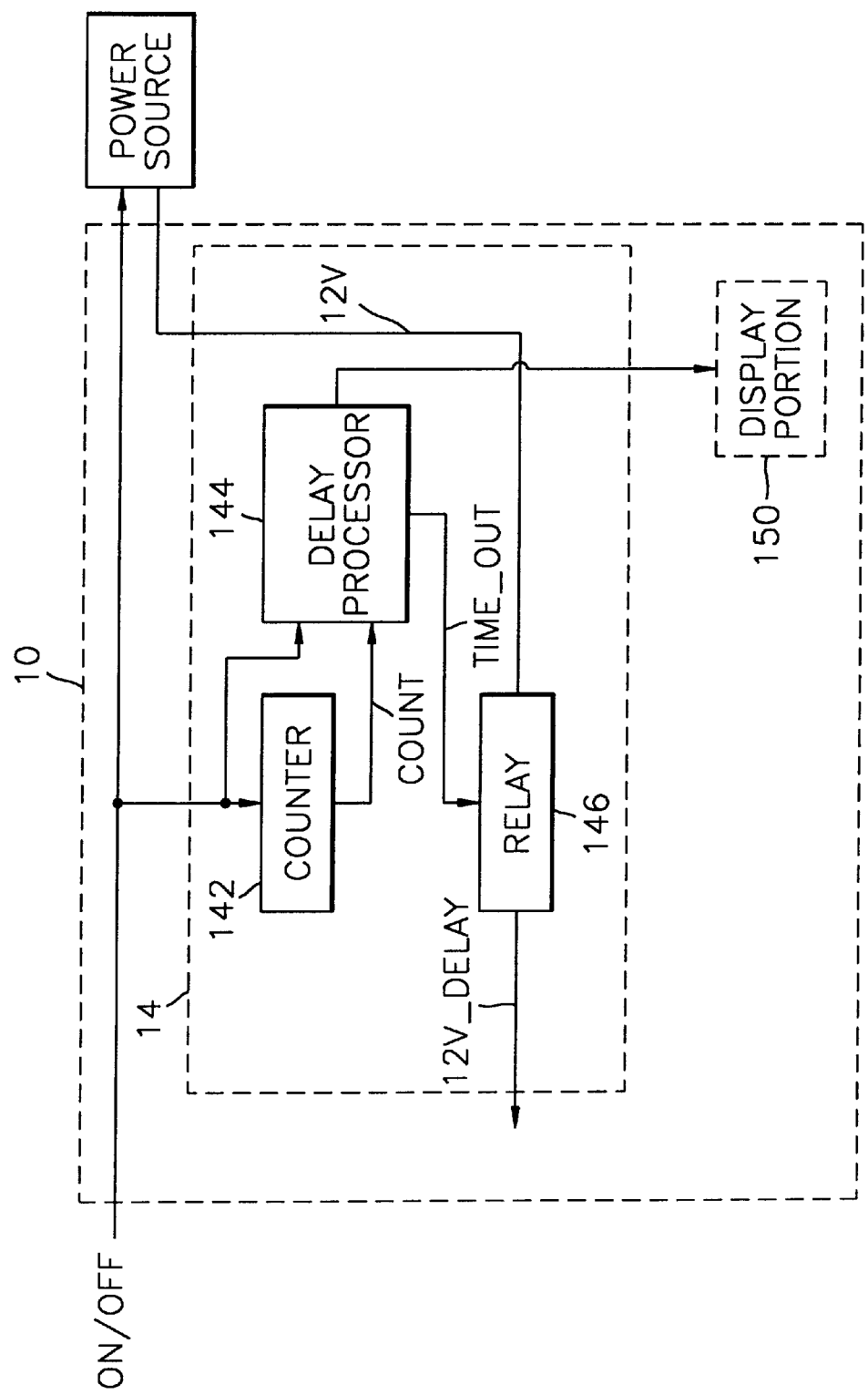
FIG. 1 is a block diagram illustrating the structure of a power on/off controlling apparatus according to a preferred embodiment of the present invention.
Figure 2A:
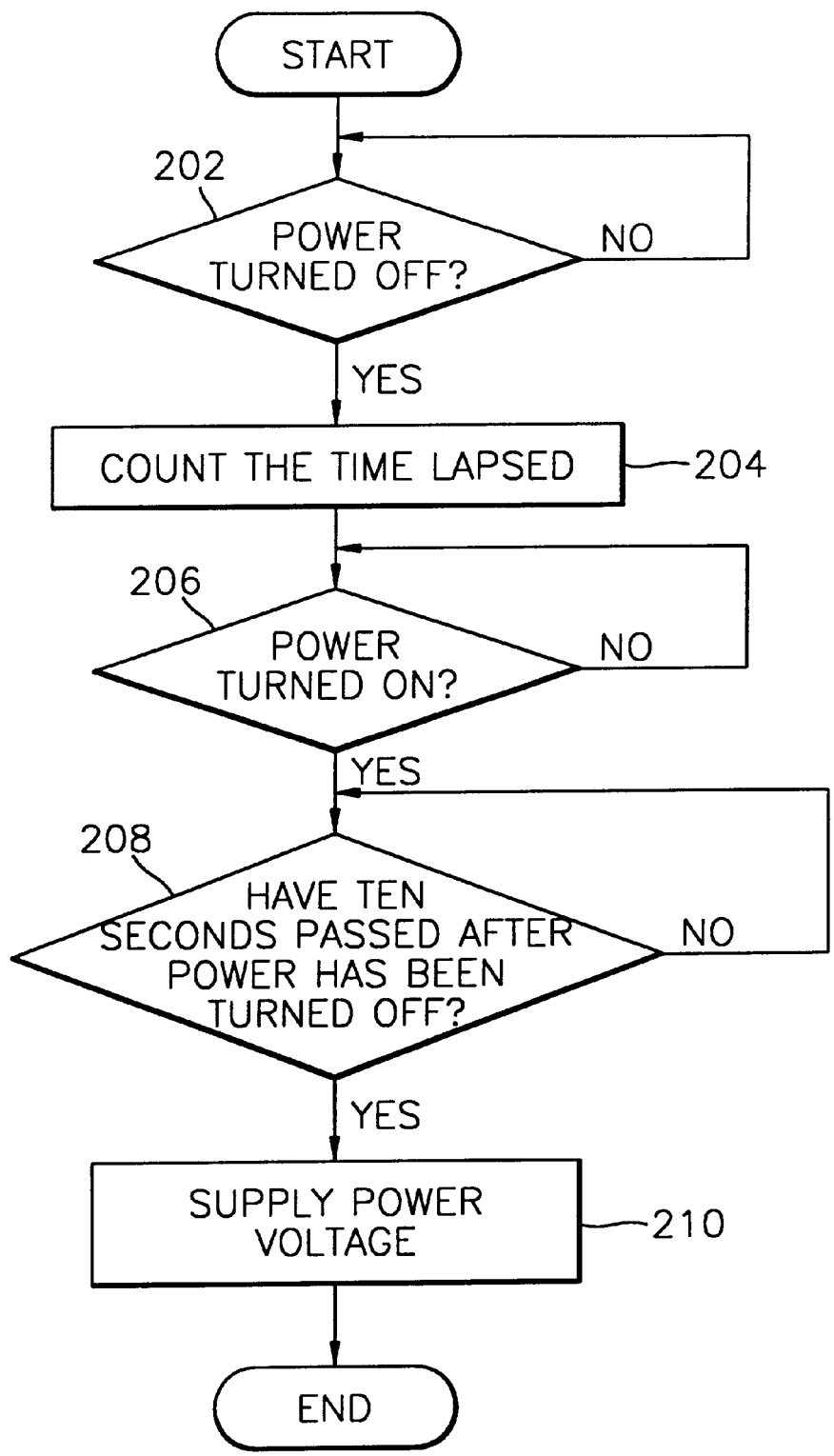
FIG. 2A is a flowchart illustrating a method according to an embodiment of the present invention.
Figure 2B:
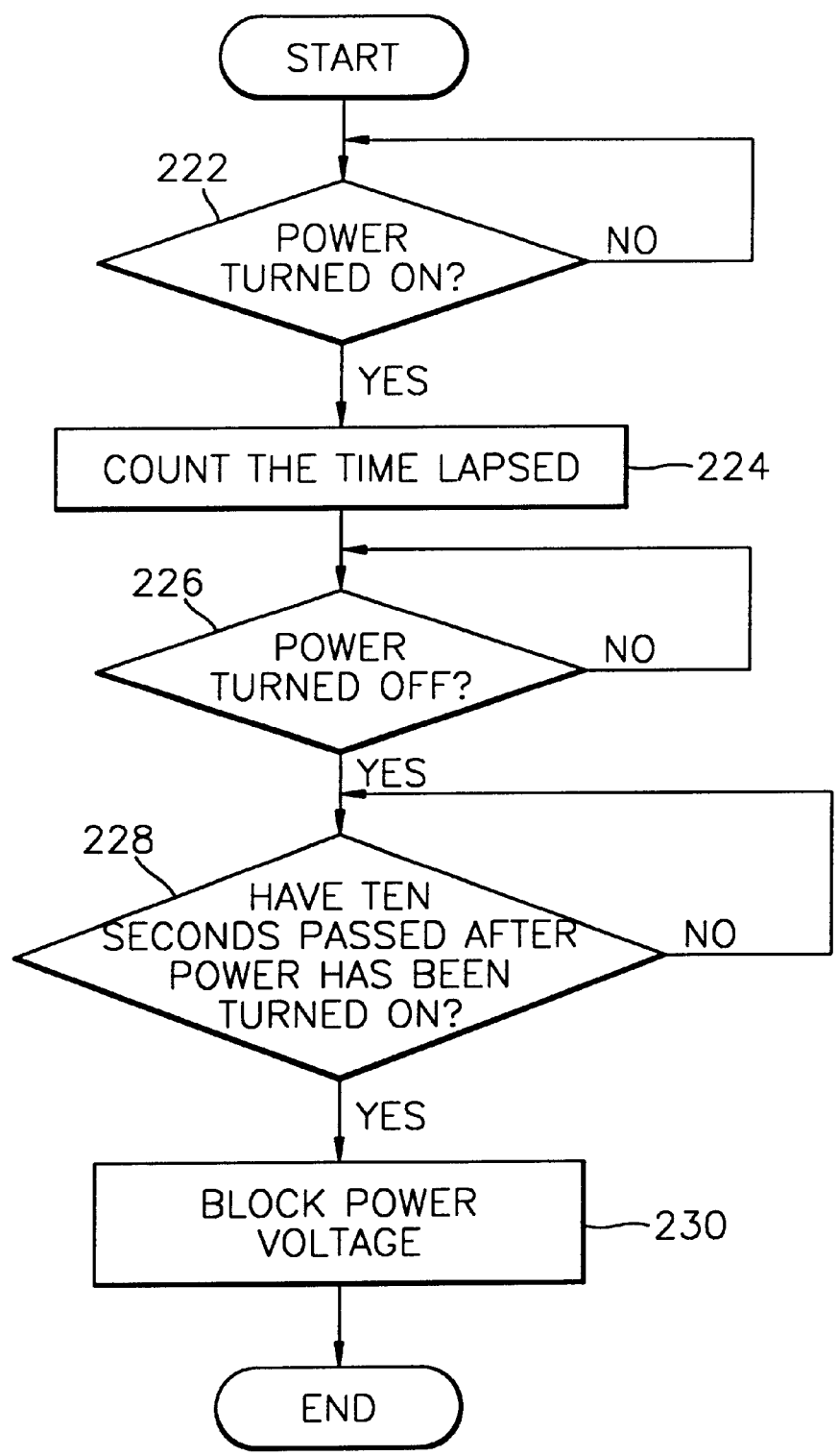
FIG. 2B is a flowchart illustrating a method according to another embodiment of the present invention.

FIG. 1 shows an illustrative example of an embodiment of a power control apparatus 14, and FIGS. 2A and 2B show illustrative examples of methods performed by the apparatus 14. As shown in FIG. 1, the power control apparatus 14 comprises a counter 142, a delay processor 144, and a relay 146. The apparatus 14 receives a power voltage 12V from a power source and applies a corresponding power voltage 12V_DELAY to a device 10.

In order to stop the supply of the power voltage 12V_DELAY to the device 10, an OFF signal is input to the power source and the counter 142. The OFF signal may be generated when a user turns an ON/OFF switch of the device 10 to an OFF position. When the OFF signal is input to stop the supply of the power voltage 12V_DELAY (step 202), the counter 142 begins counting and outputs a corresponding count signal COUNT (step 204). The value of the signal COUNT corresponds to the amount of time that has elapsed since the OFF signal has been input. The delay processor 144 inputs the count signal COUNT and outputs a time out signal TIME_OUT based on the value of the signal COUNT. For example, the processor 144 may output a logic "0" as the signal TIME_OUT when the signal COUNT indicates that less than a predetermined amount of time (e.g. ten seconds) has elapsed since the OFF signal has been input. On the other hand, the processor 144 may output a logic "1" as the signal TIME_OUT when the signal COUNT indicates that more than ten seconds has elapsed since the OFF signal has been input. The OFF signal is also supplied to the delay processor 144 and used for time synchronization, and the delay processor 144 may delay (and possibly invert) the OFF signal by the predetermined period of time to produce the TIME_OUT signal.

In addition, the relay 146 inputs the power voltage 12V and the signal TIME_OUT and selectively outputs the voltage 12V as the power voltage 12V_DELAY based on the signal TIME_OUT. For example, if the signal TIME_OUT equals a logic "0", the relay 146 may not output the power voltage 12V DELAY, but if the signal TIME_OUT equals a logic "1" the relay 146 may output the power voltage 12V_DELAY.

After the power source has been turned OFF, the power control apparatus 14 determines if an ON signal is input to supply the power voltage 12V_DELAY to the device 10 (step 206). As in the case of the OFF signal, the ON signal may be generated when a user turns an ON/OFF switch of the device 10 to an ON position. If the ON signal has been input and the predetermined period of time (e.g. ten seconds) has elapsed since the power source has been turned OFF (step 208), the signal TIME_OUT equals a logic "1", and the relay 146 outputs the power voltage 12V as the power voltage 12V_DELAY (step 210). On the other hand, if the ON signal is input and ten seconds has not elapsed since the power source has been turned OFF (step 208), the signal TIME_OUT equals a logic "0", and the relay 146 does output the power voltage 12V_DELAY.

The delay processor 144 also calculates the difference between the time that has elapsed since the OFF signal was input and the predetermined period of time based on the signal COUNT. Then, when the user inputs the ON signal before the predetermined period of time elapses, the processor 144 outputs an information signal based on the calculated difference to a display portion 150, and the display portion 150 displays information about the time remaining until the power voltage 12V_DELAY will supplied to the device 10. For example, the display portion 150 may display a message such as "WAIT" or "PLEASE WAIT FOR X SECONDS" based on the information signal. As a result, the system provides the user with feedback so that he or she can recognize that the ON signal is being processed.

As described above, the power control apparatus 14 protects the device 10 by waiting for a predetermined period time after power has been turned off before supplying power to the device 10 again. In addition to or instead of preventing power from being supplied to the device for a predetermined time after power has been turned off, the power control apparatus 14 may also prevent power from being turned off for a predetermined period of time after power is turned on.

For example, as shown in FIG. 2B, after an ON signal is input to supply the power voltage 12V_DELAY to the device 10 (step 222), the counter 142 starts counting and outputs a corresponding count signal COUNT (step 224). The delay processor 144 inputs the count signal COUNT and outputs the time out signal TIME_OUT based on the value of the signal COUNT. In particular, the processor 144 may output a logic "1" as the signal TIME_OUT when the signal COUNT indicates that less than a predetermined time (e.g. ten seconds) has elapsed since the ON signal has been input. On the other hand, the processor 144 may output a logic "0" as the signal TIME_OUT when the signal COUNT indicates that more than ten seconds has elapsed since the ON signal has been input. The ON signal is also supplied to the delay processor 144 and used for time synchronization, and the delay processor 144 may delay (and possibly invert) the ON signal by the predetermined period of time to produce the TIME_OUT signal.

After the power source has been turned ON, the power control apparatus 14 determines if an OFF signal is input to stop the supply of the power voltage 12V_DELAY to the device 10 (step 226). If the OFF signal has been input and the predetermined period of time (e.g. ten seconds) has elapsed since the power source has been turned ON (step 228), the signal TIME-OUT equals a logic "0", and the relay 146 stops outputting the power voltage 12V as the power voltage 12V_DELAY (step 230). On the other hand, if the OFF signal is input and ten seconds has not elapsed since the power source has been turned ON (step 228), the signal TIME_OUT equals a logic "1", and the relay 146 continues to output the power voltage 12V_DELAY.

In the above example, the power source continues to supply the voltage 12V for a certain period of time after the OFF signal has been input, and thus, the OFF signal does not immediately cause the power source to stop outputting the voltage 12V. In order to continue supplying the voltage after the OFF signal is input, the power supply may contain a delay circuit that inputs the OFF signal and outputs a command that turns OFF the power supply after a predetermined period of time. Alternatively, the power voltage 12V_DELAY output from the relay 146 may be fed back to the power source, and the power source may turn OFF after receiving the OFF signal and after the voltage 12V_DELAY stops being output.

Also, as in the previous case when the user inputs the ON command before the predetermined time has elapsed, the display portion 150 may receive an information signal from the processor 144 and inform a user that the OFF signal has been received but that the predetermined time has not elapsed. For example, the display portion 150 may display a message such as "WAIT" or "PLEASE WAIT FOR X SECONDS" after the OFF signal is input.

As described above, the power control apparatus 14 protects the device 10 by waiting for a predetermined period time after power has been turned ON before stopping the supply of power to the device 10.

The previous description of the preferred embodiments is provided to enable a person skilled in the art to make or use the present invention. Moreover, various modifications to these embodiments will be readily apparent to those skilled in the art, and the generic principles defined herein may be applied to other embodiments without the use of inventive faculty. Therefore, the present invention is not intended to be limited to the embodiments described herein but is to be accorded the widest scope as defined by the claims.

What is claimed is:

1. A power control apparatus for receiving an input power voltage from a power source and supplying a corresponding output power voltage to a device, the apparatus comprising:

a counter that inputs a power control signal and outputs a count signal, wherein the count signal corresponds to a lapsed time from when the power control signal is input;

a processor that inputs the count signal and outputs a time out signal, wherein the time out signal has a first value if the lapsed time is less than a predetermined time and has a second value if the lapsed time is greater than the predetermined time; and a switch that receives the input power voltage from the power source and the time out signal, wherein the switch outputs the output power voltage to the device when the input power voltage is received and the time out signal has the second value and does not output the output power voltage to the device and the time out signal has the first value.

2. The apparatus of claim 1, further comprising:

an output device, wherein, if the lapsed time is less than the predetermined time, the processor outputs an information signal to the output device and the output device generates an output signal indicating that the power control signal has been input.

3. The apparatus of claim 2, wherein the output device comprises a display and wherein the output signal is a message displayed on the display.

4. The apparatus of claim 1, wherein the power control signal is an off signal generated in response to an off command input by a user, wherein the processor inputs an on signal generated in response to an on command input by the user, wherein the on signal is generated after the off signal, and wherein the processor outputs the time out signal having the second value if the lapsed time is greater than the predetermined time and the on signal has been input.

5. The apparatus of claim 1, wherein the power control signal is an off signal generated in response to an off command input by a user, and wherein the off signal instructs the power source to stop outputting the input power voltage to the switch.

6. The apparatus of claim 5, wherein an on signal is generated after the off signal in response to an on command input by a user, wherein the on signal instructs the power source to output the input power voltage to the switch, and wherein switch outputs the output power voltage when the input power voltage is output in response to the on command and the time out signal has the second value.

7. The apparatus of claim 1, wherein the switch comprises a relay.

8. A power control apparatus for receiving an input power voltage from a power source and supplying a corresponding output power voltage to a device, the apparatus comprising:

a counter that inputs a power control signal and outputs a count signal, wherein the count signal corresponds to a lapsed time from when the power control signal is input;

a processor that inputs the count signal and outputs a time out signal, wherein the time out signal has a first value if the lapsed time is less than a predetermined time and has a second value if the lapsed time is greater than the predetermined time; and a switch that receives the input power voltage from the power source and the time out signal, wherein the switch does not output the output power voltage to the device when the time out signal has the second value and outputs the output power voltage to the device when the input power voltage is received and the time out signal has the first value.

9. The apparatus of claim 8, further comprising:

an output device, wherein, if the lapsed time is less than the predetermined time, the processor outputs an information signal to the output device and the output device generates an output signal indicating that the power control signal has been input.

10. The apparatus of claim 9, wherein the output device comprises a display and wherein the output signal is a message displayed on the display.

11. The apparatus of claim 8, wherein the power control signal is an on signal generated in response to an on command input by a user, wherein the processor inputs an off signal generated in response to an off command input by the user, wherein the off signal is generated after the on signal, and wherein the processor outputs the time out signal having the second value if the lapsed time is greater than the predetermined time and the off signal has been input.

12. The apparatus of claim 8, wherein the power control signal is an on signal generated in response to an on command input by a user, and wherein the on signal instructs the power source to output the input power voltage to the switch.

13. The apparatus of claim 8, wherein the switch comprises a relay.

14. A power control method for controlling the supply of a power supply voltage to a device, the method comprising:

(a) inputting a first power signal;

(b) counting a lapsed time from when the first power command is input;

(c) inputting a second power signal;

(d) determining if the lapsed time and a predetermined time have a first predetermined relationship when the second power signal is input;

(e) selectively outputting the power supply voltage to the device depending on whether or not the lapsed time and the predetermined time have the first predetermined relationship.

15. The method as claimed in claim 14, wherein the first power signal is an off signal to stop the supply of the power supply voltage to the device and the second power signal is an on signal to supply the power supply voltage to the device, wherein the first predetermined relationship is satisfied when the lapsed time is greater than the predetermined time and is not satisfied when the lapsed time is less than the predetermined time, wherein the power supply voltage is supplied to the device when the first predetermined relationship is satisfied and the on signal is input, and wherein the power supply voltage is not supplied to the device when the first predetermined relationship is not satisfied.

16. The method as claimed in claim 14, wherein the first power signal is an on signal to supply the power supply voltage to the device and the second power signal is an off signal to stop the supply the power supply voltage to the device, wherein the first predetermined relationship is satisfied when the lapsed time is greater than the predetermined time and is not satisfied when the lapsed time is less than the predetermined time, and wherein the power supply voltage is not supplied to the device when the first predetermined relationship is satisfied and the off signal is input, and wherein the power supply signal is supplied to the device when the first predetermined relationship is not satisfied.

17. The apparatus of claim 1, wherein said count signal contains a counted data value that indicates said lapsed time.

18. The apparatus of claim 8, wherein said count signal contains a counted data value that indicates said lapsed time.

19. The method as claimed in claim 14, wherein said operation (b) comprises:

(b1) counting said lapsed time via a counter; and (b2) outputting, from said counter, a count signal that contains a counted data value that indicates said lapsed time.

20. The method as claimed in claim 19, wherein said operation (d) comprises:

(d1) inputting said count signal and said second power signal via a processor;

(d2) analyzing said count signal via said processor to determine if said lapsed time and said predetermined time have said first relationship when said second power signal is input to said processor.

* * * * *